(12) United States Patent
Matsuoka

(10) Patent No.: US 12,109,876 B2
(45) Date of Patent: Oct. 8, 2024

(54) DRIVE UNIT

(71) Applicant: EXEDY Corporation, Neyagawa (JP)

(72) Inventor: Yoshihiro Matsuoka, Neyagawa (JP)

(73) Assignee: EXEDY Corporation, Osaka (JP)

(*) Notice: Subject to any disclaimer, the term of this patent is extended or adjusted under 35 U.S.C. 154(b) by 325 days.

(21) Appl. No.: 17/683,861

(22) Filed: Mar. 1, 2022

(65) Prior Publication Data

US 2022/0314768 A1    Oct. 6, 2022

(30) Foreign Application Priority Data

Apr. 1, 2021  (JP) ................ 2021-062687

(51) Int. Cl.
*B60K 1/02*   (2006.01)
*B60L 1/00*   (2006.01)
*B60L 3/00*   (2019.01)
*B60L 58/24*  (2019.01)

(52) U.S. Cl.
CPC ............ *B60K 1/02* (2013.01); *B60L 1/003* (2013.01); *B60L 3/0061* (2013.01); *B60L 58/24* (2019.02); *B60L 2240/36* (2013.01); *B60L 2240/425* (2013.01); *B60L 2240/545* (2013.01); *B60L 2240/662* (2013.01)

(58) Field of Classification Search
CPC ...... B60L 58/26; B60L 1/003; B60L 2220/42; F16H 41/04; F16H 41/30; F16H 61/64; B60K 1/02
See application file for complete search history.

(56) References Cited

U.S. PATENT DOCUMENTS

| 2003/0171187 A1* | 9/2003 | Aoki ............... B60K 6/485 477/107 |
| 2009/0074590 A1* | 3/2009 | Tsuda .............. B60K 6/48 417/32 |
| 2012/0060485 A1* | 3/2012 | Yamada .......... F16H 61/0025 60/436 |
| 2021/0404546 A1* | 12/2021 | Balistreri ....... F16H 57/0447 |

FOREIGN PATENT DOCUMENTS

| JP | 2000227150 A | * | 8/2000 |
| JP | 2004256063 A | * | 9/2004 |
| JP | 2009126256 A | * | 6/2009 |
| JP | 2011-205831 A |   | 10/2011 |

OTHER PUBLICATIONS

Machine translation of JP-2000227150-A (Year: 2000).*
Machine translation of JP-2004256063-A (Year: 2004).*
Machine translation of JP-2009126256-A (Year: 2009).*

* cited by examiner

*Primary Examiner* — Navid Z. Mehdizadeh
*Assistant Examiner* — Caitlin R McCleary
(74) *Attorney, Agent, or Firm* — United IP Counselors, LLC

(57) ABSTRACT

A drive unit includes a first electric motor, a fluid coupling, a pump, a second electric motor, and a controller. The first electric motor is configured to drive a drive wheel. The fluid coupling is configured such that a torque outputted from the first electric motor is inputted thereto. The pump is configured to supply a working fluid to an interior of the fluid coupling. The second electric motor is configured to drive the pump. The controller controls the second electric motor based on at least one of an input/output rotational ratio of the fluid coupling, a temperature of the working fluid in the interior of the fluid coupling, or an amount of the working fluid in the interior of the fluid coupling.

4 Claims, 4 Drawing Sheets

DRIVE UNIT

CROSS-REFERENCE TO RELATED APPLICATIONS

This application claims priority to Japanese Patent Application No. 2021-062687 filed Apr. 1, 2021. The entire contents of that application are incorporated by reference herein in their entirety.

TECHNICAL FIELD

The present invention relates to a drive unit.

BACKGROUND ART

In recent years, there have been proposed electric cars equipped with a torque converter. For example, Japan Laid-open Patent Application Publication No. 2011-205831 describes an electric car that a torque, outputted from an electric motor, is transmitted to drive wheels through a torque converter. Besides, the electric car described in Japan Laid-open Patent Application Publication No. 2011-205831 is equipped with an oil pump for supplying an oil to the torque converter. The oil pump is connected to an impeller of the torque converter and is driven by rotation of the impeller. In other words, the oil pump is driven by the electric motor.

In the electric car configured as described above, the oil pump is driven by the electric motor for driving the drive wheels. Because of this, the oil pump is constantly being actuated in traveling.

It is an object of the present invention to drive the pump in timely manner.

BRIEF SUMMARY

A drive unit according to an aspect of the present invention includes a first electric motor, a fluid coupling, a pump, a second electric motor, and a controller. The first electric motor is configured to drive a drive wheel. The fluid coupling is configured such that a torque outputted from the first electric motor is inputted thereto. The pump is configured to supply a working fluid to an interior of the fluid coupling. The second electric motor is configured to drive the pump. The controller controls the second electric motor based on at least one of an input/output rotational ratio of the fluid coupling, a temperature of the working fluid in the interior of the fluid coupling, or an amount of the working fluid in the interior of the fluid coupling.

According to the configuration described above, the pump is driven by the second electric motor not by the first electric motor for driving the drive wheel. Because of this, it is not necessarily true that the pump is constantly being actuated in traveling. Besides, the controller controls the second electric motor based on at least one of the input/output rotational ratio of the fluid coupling, the temperature of the working fluid in the interior of the fluid coupling, or the amount of the working fluid in the interior of the fluid coupling. Because of this, the pump can be driven in timely manner.

Preferably, the drive unit further includes a tank. The tank stores the working fluid to be supplied to the fluid coupling. The controller determines the amount of the working fluid in the interior of the fluid coupling based on an amount of the working fluid in an interior of the tank.

Preferably, the controller controls the second electric motor based on a rotational direction of the first electric motor.

Preferably, the drive unit further includes a battery temperature adjusting circuit, a working fluid cooler, a first channel, a second channel, and a switching valve. The battery temperature adjusting circuit is configured to adjust a temperature of a battery by the working fluid. The working fluid cooler is configured to cool the working fluid. The first channel is configured to supply the working fluid to the battery temperature adjusting circuit through the working fluid cooler. The second channel is configured to supply the working fluid to the battery temperature adjusting circuit without through the working fluid cooler. The switching valve is configured to switch between the first channel and the second channel as a channel for suppling the working fluid.

Preferably, the controller controls the switching valve based on an external temperature.

Overall, according to the present invention, the oil pump can be driven in timely manner.

DETAILED DESCRIPTION

Figure 1:
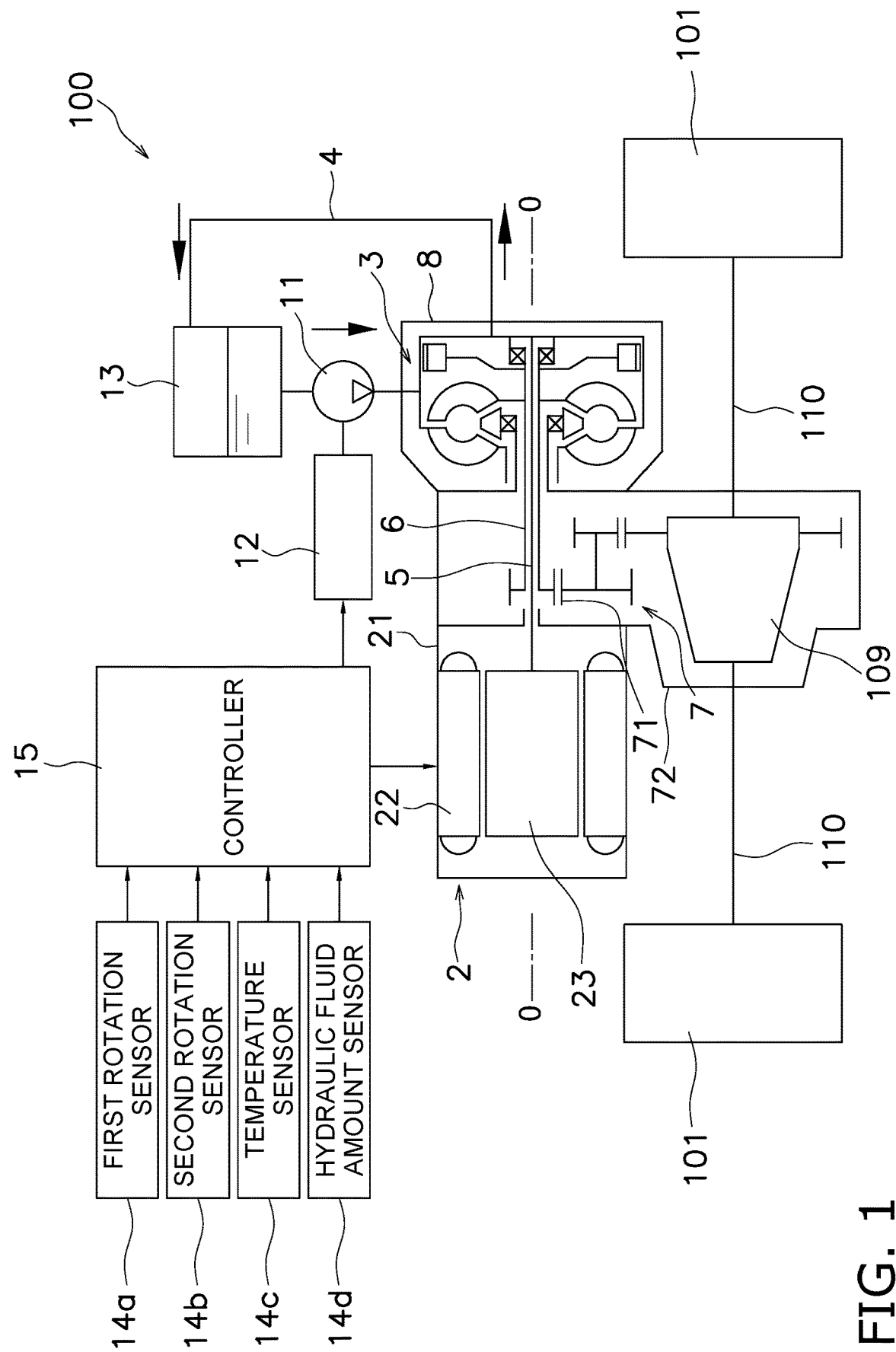
FIG. 1 is a schematic diagram of a drive unit.

A preferred embodiment of a drive unit will be hereinafter explained with reference to drawings. FIG. 1 is a schematic diagram of the drive unit according to the present preferred embodiment. It should be noted that in the following explanation, the term "axial direction" refers to an extending direction of a rotational axis O of a first electric motor 2 and a torque converter 3. On the other hand, the term "circumferential direction" refers to a circumferential direction of an imaginary circle about the rotational axis O, whereas the term "radial direction" refers to a radial direction of the imaginary circle about the rotational axis O. Moreover, the term "forward rotation" refers to rotation in forward movement of a vehicle, whereas the term "reverse rotation" refers to rotation in backward movement of the vehicle.

[Drive Unit 100]

As shown in FIG. 1, a drive unit 100 includes the first electric motor 2, the torque converter 3 (exemplary fluid coupling), an input shaft 5, an output shaft 6, a reducer 7, a torque converter casing 8, a pump 11, a second electric motor 12, a tank 13, and a controller 15. The drive unit 100 is installed in, for instance, an electric car. The drive unit 100 is configured to actuate drive wheels 101.

<First Electric Motor 2>

The first electric motor 2 is configured to drive the drive wheels 101. The first electric motor 2 includes a motor casing 21, a stator 22, and a rotor 23. In the present preferred embodiment, the first electric motor 2 is a so-called inner rotor motor. The motor casing 21 is non-rotatable, while being fixed to a vehicle body frame or so forth.

The stator 22 is fixed to the inner peripheral surface of the motor casing 21. The stator 22 is non-rotatable. The rotor 23 is rotated about the rotational axis O. The rotor 23 is disposed radially inside the stator 22. The first electric motor 2 is forwardly rotated and is also reversely rotated. When the first electric motor 2 is forwardly rotated, the vehicle is moved forward. When the first electric motor 2 is reversely rotated, the vehicle is moved backward.

<Torque Converter 3>

The torque converter 3 is disposed at an interval from the first electric motor 2 in the axial direction. The reducer 7 is disposed between the torque converter 3 and the first electric motor 2. The first electric motor 2, the reducer 7, and the torque converter 3 are axially aligned in this order.

The rotational axis O of the torque converter 3 is substantially matched with that of the first electric motor 2. The torque converter 3 is a device to which a torque, outputted from the first electric motor 2, is inputted. The torque converter 3 amplifies the torque inputted thereto from the first electric motor 2 and outputs the amplified torque to the reducer 7.

Figure 2:
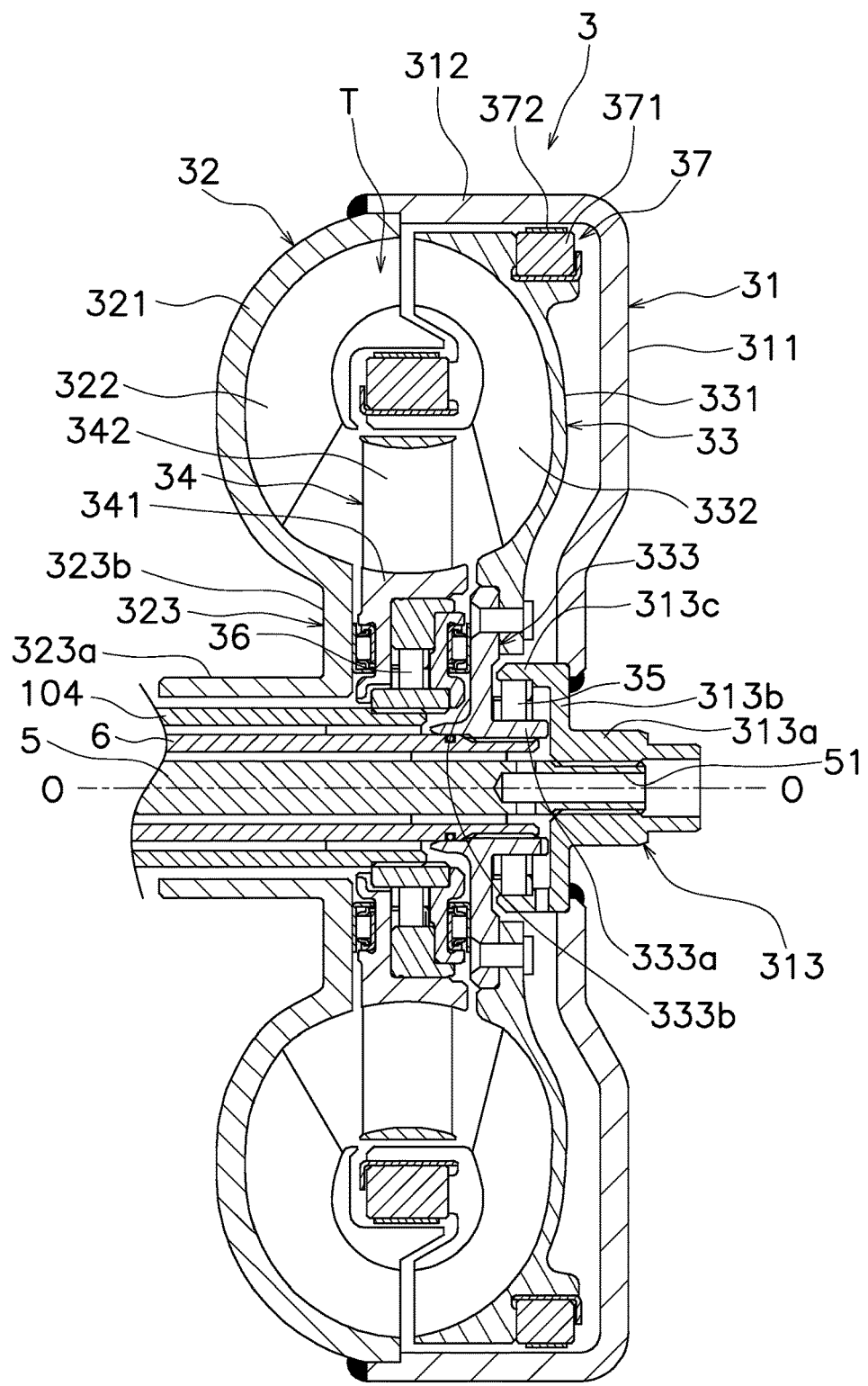
FIG. 2 is a cross-sectional view of a torque converter.

As shown in FIG. 2, the torque converter 3 includes a cover 31, an impeller 32, a turbine 33, a stator 34, a first one-way clutch 35, and a second one-way clutch 36. Besides, the torque converter 3 further includes a centrifugal lock-up clutch 37. In the present preferred embodiment, the outer shell of the torque converter 3 is composed of the cover 31 and an impeller shell 321 to be described. The torque converter 3 transmits the torque through a working fluid.

The torque converter 3 is disposed such that the impeller 32 faces the first electric motor 2 (the left side in FIG. 2), whereas the cover 31 faces opposite to the first electric motor 2 (the right side in FIG. 2). The torque converter 3 is accommodated in the interior of the torque converter casing 8. The torque converter 3 is filled with the working fluid in the interior thereof. The working fluid is, for instance, a hydraulic oil.

The cover 31 is a component to which the torque, outputted from the first electric motor 2, is inputted. The cover 31 is rotated by the torque inputted thereto from the first electric motor 2. The cover 31 is fixed to the input shaft 5. For example, the cover 31 includes a spline hole to which the input shaft 5 is spline-coupled. Because of this, the cover 31 is rotated unitarily with the input shaft 5. The cover 31 is disposed to cover the turbine 33.

The cover 31 includes a disc portion 311, a cylindrical portion 312, and a cover hub 313. The disc portion 311 includes an opening in the middle thereof. The cylindrical portion 312 extends from the outer peripheral end of the disc portion 311 toward the first electric motor 2. The disc portion 311 and the cylindrical portion 312 are provided as a single member.

The cover hub 313 is fixed to the inner peripheral end of the disc portion 311. In the present preferred embodiment, the cover hub 313 is provided as a member separated from the disc portion 311. However, the cover hub 313 can be provided together with the disc portion 311 as a single member.

The cover hub 313 includes a first boss portion 313a, a first flange portion 313b, and a protruding portion 313c. The first boss portion 313a, the first flange portion 313b, and the protruding portion 313c are provided as a single member.

The first boss portion 313a has a cylindrical shape and includes a spline hole. The input shaft 5 is spline-coupled to the first boss portion 313a. The first boss portion 313a is rotatably supported by the torque converter casing 8 through a bearing member (not showing in the drawings). The first boss portion 313a axially extends from the first flange portion 313b to the opposite side of the first electric motor 2.

The first flange portion 313b extends radially outward from the first boss portion 313a. When described in detail, the first flange portion 313b extends radially outward from the first electric motor 2-side end of the first boss portion 313a. The disc portion 311 is fixed to the outer peripheral end of the first flange portion 313b.

The protruding portion 313c axially extends from the first flange portion 313b. The protruding portion 313c extends toward the first electric motor 2. The protruding portion 313c extends from the outer peripheral end of the first flange portion 313b. The protruding portion 313c has a cylindrical shape.

The impeller 32 is rotated unitarily with the cover 31. The impeller 32 is a component to which the torque, outputted from the first electric motor 2, is inputted through the cover 31. The impeller 32 is fixed to the cover 31. The impeller 32 includes an impeller shell 321, a plurality of impeller blades 322, and an impeller hub 323.

The impeller shell 321 is fixed to the cover 31. The plural impeller blades 322 are attached to the inner surface of the impeller shell 321.

The impeller hub 323 is attached to the inner peripheral end of the impeller shell 321. It should be noted that in the present preferred embodiment, the impeller hub 323 is provided together with the impeller shell 321 as a single member but can be provided as a member separated from the impeller shell 321.

The impeller hub 323 includes a second boss portion 323a and a second flange portion 323b. The second flange portion 323b extends radially outward from the second boss portion 323a. The second boss portion 323a has a cylindrical shape and axially extends. The second boss portion 323a is rotatably supported by the torque converter casing 8 through a bearing member (not shown in the drawings).

A stationary shaft 104 (exemplary shaft member) axially extends through the interior of the second boss portion 323a. It should be noted that the stationary shaft 104 has a cylindrical shape and the output shaft 6 axially extends through the interior of the stationary shaft 104. Besides, the stationary shaft 104 extends from, for instance, a transmission casing 72 or the torque converter casing 8. The stationary shaft 104 is non-rotatable. In other words, the stationary shaft 104 is rotated relative to the torque converter 3.

The turbine 33 is disposed in opposition to the impeller 32. When described in detail, the turbine 33 is axially opposed to the impeller 32. The turbine 33 is a component to which the torque is transmitted from the impeller 32 through the working fluid.

The turbine 33 includes a turbine shell 331, a plurality of turbine blades 332, and a turbine hub 333. The plural turbine blades 332 are fixed to the inner surface of the turbine shell 331.

The turbine hub 333 is fixed to the inner peripheral end of the turbine shell 331. For example, the turbine hub 333 is fixed to the turbine shell 331 by rivets. In the present preferred embodiment, the turbine hub 333 is provided as a member separated from the turbine shell 331. However, the turbine hub 333 can be provided together with the turbine shell 331 as a single member.

The output shaft 6 is attached to the turbine hub 333. When described in detail, the output shaft 6 is spline-coupled to the turbine hub 333. The turbine hub 333 is rotated unitarily with the output shaft 6.

The turbine hub 333 includes a third boss portion 333a and a third flange portion 333b. The third boss portion 333a and the third flange portion 333b are provided as a single member.

The third boss portion 333a has a cylindrical shape and includes a spline hole. The output shaft 6 is spline-coupled to the third boss portion 333a. The third boss portion 333a axially extends from the third flange portion 333b to the opposite side of the first electric motor 2. In other words, the third boss portion 333a axially extends from the third flange portion 333b toward the cover hub 313.

The third boss portion 333a is disposed at a radial interval from the protruding portion 313c. In other words, the protruding portion 313c is disposed radially outside the third boss portion 333a. The first one-way clutch 35 is disposed between the third boss portion 333a and the protruding portion 313c. It should be noted that without installation of the first one-way clutch 35, the outer peripheral surface of the third boss portion 333a and the inner peripheral surface of the protruding portion 313c are opposed to each other.

The third flange portion 333b extends radially outward from the third boss portion 333a. When described in detail, the third flange portion 333b extends radially outward from the first electric motor 2-side end of the third boss portion 333a. The turbine shell 331 is fixed to the outer peripheral end of the third flange portion 333b by the rivets or so forth.

The stator 34 is configured to regulate the flow of the oil returning from the turbine 33 to the impeller 32. The stator 34 is rotatable about the rotational axis O. For example, the stator 34 is supported by the stationary shaft 104 through the second one-way clutch 36. The stator 34 is disposed axially between the impeller 32 and the turbine 33.

The stator 34 includes a stator carrier 341 having a disc shape and a plurality of stator blades 342 attached to the outer peripheral surface of the stator carrier 341.

The first one-way clutch 35 is disposed between the cover 31 and the turbine 33. The first one-way clutch 35 makes the cover 31 rotatable relative to the turbine 33 in a forward rotational direction. In other words, when the first electric motor 2 is forwardly rotated to move the vehicle forward, the first one-way clutch 35 is configured such that the cover 31 is rotated relative to the turbine 33. Because of this, in forward movement of the vehicle, the first one-way clutch 35 does not transmit the torque from the cover 31 to the turbine 33.

By contrast, the first one-way clutch 35 makes the cover 31 rotate unitarily with the turbine 33 in a reverse rotational direction. In other words, when the first electric motor 2 is reversely rotated to move the vehicle backward, the first one-way clutch 35 is configured such that the cover 31 is rotated unitarily with the turbine 33. Because of this, in backward movement of the vehicle, the first one-way clutch 35 transmits the torque from the cover 31 to the turbine 33.

The second one-way clutch 36 is disposed between the stationary shaft 104 and the stator 34. The second one-way clutch 36 is configured to make the stator 34 rotatable in the forward rotational direction. By contrast, the second one-way clutch 36 makes the stator 34 non-rotatable in the reverse rotational direction. The torque is transmitted from the impeller 32 to the turbine 33, while being amplified by the stator 34.

The centrifugal lock-up clutch 37 is configured to be actuated by rotation of the torque converter 3. In other words, the centrifugal lock-up clutch 37 is not configured to be actuated by the fluid pressure of the working fluid. The centrifugal lock-up clutch 37 is attached to the turbine 33. The centrifugal lock-up clutch 37 is rotated unitarily with the turbine 33.

The centrifugal lock-up clutch 37 is configured to couple the impeller 32 and the turbine 33 to each other by a centrifugal force generated in rotation of the turbine 33 without through the working fluid. It should be noted that the centrifugal lock-up clutch 37 couples the impeller 32 and the turbine 33 through the cover 31. When described in detail, the centrifugal lock-up clutch 37 is configured to transmit the torque from the cover 31 to the turbine 33 when the rotational speed of the turbine 33 becomes greater than or equal to a predetermined value.

The centrifugal lock-up clutch 37 includes a plurality of centrifugal elements 371 and a friction material 372. The friction material 372 is attached to the outer peripheral surfaces of the centrifugal elements 371. The centrifugal elements 371 are disposed, while being radially movable. It should be noted that the centrifugal elements 371 are disposed, while being circumferentially immovable. Because of this, the centrifugal elements 371 are rotated together with the turbine 33 and are moved radially outward by centrifugal forces.

When the rotational speed of the turbine 33 becomes greater than or equal to the predetermined value, the centrifugal lock-up clutch 37 is configured such that the centrifugal elements 371 are moved radially outward and the friction material 372 is engaged by friction with the inner peripheral surface of the cylindrical portion 312 of the cover 31. As a result, the centrifugal lock-up clutch 37 is turned to an on state, whereby the torque inputted to the cover 31 is transmitted therefrom to the turbine 33 through the centrifugal lock-up clutch 37.

When the rotational speed of the turbine 33 becomes less than the predetermined value, the centrifugal elements 371 are moved radially inward and the friction material 372, engaged by friction with the inner peripheral surface of the cylindrical portion 312 of the cover 31, is disengaged therefrom. As a result, the centrifugal lock-up clutch 37 is turned to an off state, whereby the torque inputted to the cover 31 is not transmitted therefrom to the turbine 33 through the centrifugal lock-up clutch 37. In other words, the torque inputted to the cover 31 is transmitted therefrom to the impeller 32 and is then transmitted to the turbine 33 through the working fluid.

<Input Shaft 5>

As shown in FIGS. 1 and 2, the input shaft 5 extends from the first electric motor 2. When described in detail, the input shaft 5 extends from the rotor 23 of the first electric motor 2. It should be noted that when the first electric motor 2 includes an output shaft, the input shaft 5 is attached to the output shaft of the first electric motor 2. The rotational axis of the input shaft 5 is substantially matched with that of the first electric motor 2 and that of the torque converter 3.

The input shaft 5 inputs the torque, outputted from the first electric motor 2, to the torque converter 3. The input shaft 5 is connected to the impeller 32 of the torque converter 3. When described in detail, the input shaft 5 is connected to the impeller 32 through the cover 31. The input shaft 5 is attached at the distal end thereof to the cover hub 313 of the torque converter 3.

The input shaft 5 extends through the interior of the output shaft 6. The input shaft 5 is solid.

<Output Shaft 6>

The output shaft 6 outputs the torque inputted thereto from the torque converter 3. The output shaft 6 outputs the torque, inputted thereto from the torque converter 3, to the reducer 7. The output shaft 6 extends from the torque converter 3 toward the first electric motor 2.

The output shaft 6 has a cylindrical shape. The input shaft 5 extends through the interior of the output shaft 6. One end (the right end in FIG. 2) of the output shaft 6 is attached to the turbine 33 of the torque converter 3. On the other hand, the other end of the output shaft 6 is provided with a gear 71 of the reducer 7 attached thereto. For example, the output shaft 6 is rotatably supported by the transmission casing 72 through a bearing member or so forth.

<Reducer 7>

As shown in FIG. 1, the reducer 7 is disposed axially between the first electric motor 2 and the torque converter 3. The reducer 7 transmits the torque, inputted thereto from the torque converter 3, to the drive wheel 101 side. When described in detail, the reducer 7 amplifies the torque inputted thereto from the torque converter 3 and transmits the amplified torque to the drive wheel 101 side through a differential gear 109. It should be noted that the reducer 7 includes a plurality of gears 71. The reducer 7 is accommodated in the interior of the transmission casing 72. It should be also noted that the gear 71 fixed to the output shaft 6 is one of the plural gears 71. The gear 71 is rotated unitarily with the output shaft 6.

<Torque Converter Casing 8>

The torque converter casing 8 accommodates the torque converter 3. The torque converter casing 8 can be provided together with the transmission casing 72 as a single member. Alternatively, the torque converter casing 8 can be provided as a member separated from the transmission casing 72. The torque converter casing 8 and the outer shell of the torque converter 3 are disposed at an interval from each other. Because of this, the torque converter casing 8 and the outer shell of the torque converter 3 form an air layer therebetween.

<Differential Gear 109>

The drive unit 100 further includes the differential gear 109 and a pair of drive shafts 110. The differential gear 109 is configured to transmit the torque, inputted thereto from the reducer 7, to the pair of drive wheels 101.

The pair of drive shafts 110 extends from the differential gear 109 to the pair of drive wheels 101, respectively. The pair of drive shafts 110 extends in parallel to the input shaft 5. Besides, the pair of drive shafts 110 extends to be offset (displaced) from the input shaft 5.

The differential gear 109 is disposed in the middle of the space between the pair of drive wheels 101 in the extending direction of the pair of drive shafts 110. In other words, the pair of drive shafts 110 is substantially equal in length to each other.

<Pump 11>

The pump 11 is configured to supply the working fluid to the interior of the torque converter 3. The working fluid is supplied to the interior of the torque converter 3 by the pump 11, for instance, through either a channel between the stationary shaft 104 and the second boss portion 323a or a channel between the stationary shaft 104 and the output shaft 6.

The pump 11 is driven by the second electric motor 12. It should be noted that the pump 11 is not driven by the first electric motor 2. It should be noted that in the present preferred embodiment, the drive unit 100 includes the pump 11 as the only pump for supplying the working fluid to the interior of the torque converter 3.

<Second Electric Motor 12>

The second electric motor 12 is configured to drive the pump 11. The second electric motor 12 is a motor provided exclusively for the pump 11. The second electric motor 12 is not used for driving the pair of drive wheels 101.

<Tank 13>

The tank 13 stores the working fluid to be supplied to the torque converter 3. The tank 13 is connected to the torque converter 3 through a circulation circuit 4.

<Various Types of Sensors>

The drive unit 100 further includes a first rotation sensor 14a, a second rotation sensor 14b, a temperature sensor 14c, and a working fluid amount sensor 14d. The first rotation sensor 14a is configured to detect the rotational speed of the impeller 32. The second rotation sensor 14b is configured to detect the rotational speed of the turbine 33.

The temperature sensor 14c is configured to detect a temperature of the working fluid in the interior of the torque converter 3. The working fluid amount sensor 14d is configured to detect the amount of the working fluid in the interior of the tank 13.

<Controller 15>

The controller 15 is configured to control the second electric motor 12. In other words, the controller 15 is configured to control the action of the pump 11 by controlling the second electric motor 12. The controller 15 includes, for instance, a CPU (Central Processing Unit), a ROM (Read Only Memory), a RAM (Random Access Memory), and so forth. The controller 15 is, for instance, a microcomputer.

When described in detail, the controller 15 controls the second electric motor 12 based on the amount of the working fluid in the interior of the torque converter 3, an input/output rotational ratio of the torque converter 3, the temperature of the working fluid in the interior of the torque converter 3, and a rotational direction of the first electric motor 2.

The controller 15 obtains information regarding the amount of the working fluid in the interior of the tank 13 from the working fluid amount sensor 14d. Then, the controller 15 controls the second electric motor 12 based on the information regarding the amount of the working fluid in the interior of the tank 13. When described in detail, the controller 15 estimates the amount of the working fluid in the interior of the torque converter 3 based on the information regarding the amount of the working fluid in the interior of the tank 13.

Then, the controller 15 determines whether or not the amount of the working fluid in the interior of the tank 13 is greater than or equal to a first threshold. When the amount of the working fluid in the interior of the tank 13 is greater than or equal to the first threshold, the amount of the working fluid in the interior of the torque converter 3 is less than a desired value. Therefore, the controller 15 turns the second electric motor 12 to an on state. The pump 11 is driven accordingly, whereby the working fluid is supplied to the interior of the torque converter 3.

It should be noted that when the amount of the working fluid in the interior of the tank 13 is less than the first threshold, this means that the working fluid has been sufficiently supplied to the interior of the torque converter 3; the amount of the working fluid in the torque converter 3 is greater than or equal to the desired value. As described above, the controller 15 indirectly determines the amount of the working fluid in the interior of the torque converter 3 and controls the second electric motor 12 based on the amount of the working fluid in the interior of the torque converter 3.

The input/output rotational ratio (N2/N1) of the torque converter 3 can be expressed by a ratio (N2/N1) of the rotational speed (N2) of the turbine 33 to the rotational speed (N1) of the impeller 32. The controller 15 obtains information regarding the rotational speed N1 of the impeller 32 detected by the first rotation sensor 14a. Besides, the controller 15 obtains information regarding the rotational speed N2 of the turbine 33 detected by the second rotation sensor 14b. Then, the controller 15 calculates the input/output rotational ratio (N2/N1) of the torque converter 3 based on the information regarding the rotational speed N1 of the impeller 32 and the information regarding the rotational speed N2 of the turbine 33.

The controller 15 controls the second electric motor 12 based on the input/output rotational ratio (N2/N1) of the torque converter 3. For example, the controller 15 determines whether or not the input/output rotational ratio (N2/N1) of the torque converter 3 is less than or equal to a second threshold. When the input/output rotational ratio (N2/N1) of the torque converter 3 is less than or equal to the second threshold, the working fluid in the interior of the torque converter 3 becomes high in temperature due to shear heat. Because of this, the controller 15 turns the second electric motor 12 to the on state. The pump 11 is driven accordingly, whereby the working fluid is supplied to the interior of the torque converter 3. As a result, the working fluid, having become high in temperature in the interior of the torque converter 3, can be fed to the outside of the torque converter 3, whereby the torque converter 3 can be inhibited from becoming high in temperature in the interior thereof.

The controller 15 obtains information regarding the temperature of the working fluid in the interior of the torque converter 3 from the temperature sensor 14c. Then, the controller 15 controls the second electric motor 12 based on the information regarding the temperature of the working fluid in the interior of the torque converter 3.

The controller 15 determines whether or not the temperature of the working fluid in the interior of the torque converter 3 is greater than or equal to a third threshold. When the temperature of the working fluid in the interior of the torque converter 3 is greater than or equal to the third threshold, the controller 15 turns the second electric motor 12 to the on state.

The controller 15 obtains information regarding the rotational direction of the first electric motor 2. For example, the controller 15 obtains information regarding which one of the following is the state of the first electric motor 2: forward rotation, reverse rotation, and stop of rotation. When reverse rotation is the state of the first electric motor 2, it is not required to supply the working fluid to the interior of the torque converter 3. Hence, the controller 15 turns the second electric motor 12 to an off state.

<Method of Controlling Drive Unit 100>

Figure 3:
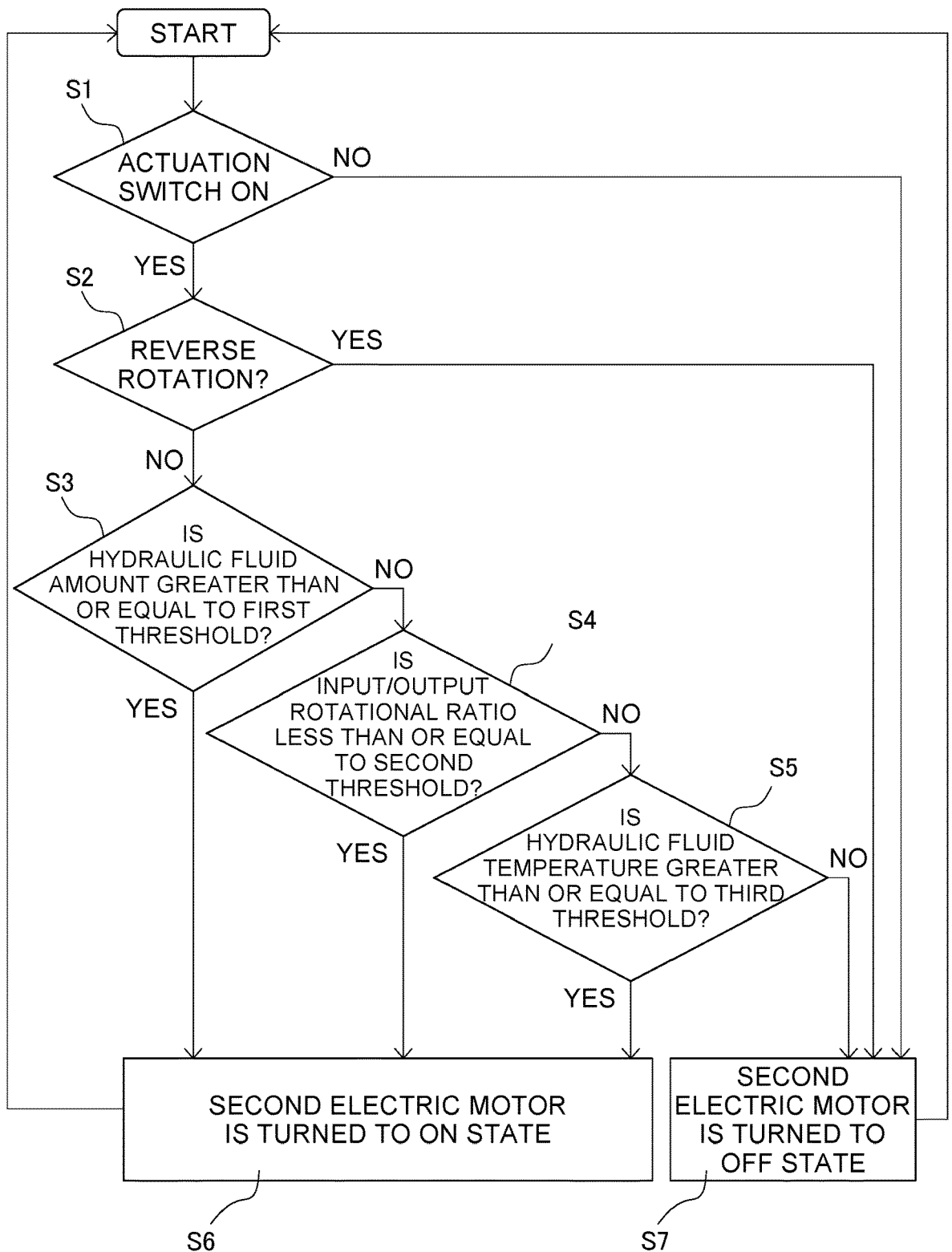
FIG. 3 is a flowchart showing an exemplary method of controlling by a controller.

FIG. 3 is a flowchart showing an exemplary method of controlling by the controller 15. As shown in FIG. 3, the controller 15 firstly determines whether or not an actuation switch has been turned to an on state (Step S1). The drive unit 100 is turned to an on state in accordance with the on state of the actuation switch.

When determining that the actuation switch is not in the on state (No in Step S1); in other words, the actuation switch is in the off state, the controller 15 turns the second electric motor 12 to the off state (step S7). As a result, the pump 11 is stopped.

When determining that the actuation switch is in the on state (Yes in Step S1), the controller 15 then determines whether or not the rotational direction of the first electric motor 2 is reverse (Step S2). When determining that the rotational direction of the first electric motor 2 is reverse (Yes in Step S2), the controller 15 turns the second electric motor 12 to the off state (Step S7).

When determining that the rotational direction of the first electric motor 2 is not reverse (No in Step S2); in other words, the state of the first electric motor 2 is either forward rotation or stop of rotation, the controller 15 then determines whether or not the amount of the working fluid in the interior of the tank 13 is greater than or equal to the first threshold (Step S3). The controller 15 indirectly determines the amount of the working fluid in the interior of the torque converter 3 by determining whether or not the amount of the working fluid in the interior of the tank 13 is greater than or equal to the first threshold.

When determining that the amount of the working fluid in the interior of the tank 13 is greater than or equal to the first threshold (Yes in Step S3), the controller 15 turns the second electric motor 12 to the on state, whereby the pump 11 is driven (Step S6).

When determining that the amount of the working fluid in the interior of the tank 13 is less than the first threshold (No in Step S3), the controller 15 then determines whether or not the input/output rotational ratio (N2/N1) is less than or equal to the second threshold (Step S4).

When determining that the input/output rotational ratio (N2/N1) is less than or equal to the second threshold (Yes in Step S4), the controller 15 turns the second electric motor 12 to the on state, whereby the pump 11 is driven (Step S6).

When determining that the input/output rotational ratio (N2/N1) is greater than the second threshold (No in Step S4), the controller 15 then determines whether or not the temperature of the working fluid in the interior of the torque converter 3 is greater than or equal to the third threshold (Step S5).

When determining that the temperature of the working fluid in the interior of the torque converter 3 is greater than or equal to the third threshold (Yes in Step S5), the controller 15 turns the second electric motor 12 to the on state, whereby the pump 11 is driven (Step S6).

When determining that the temperature of the working fluid in the interior of the torque converter 3 is less than the third threshold (No in Step S5), the controller 15 turns the second electric motor 12 to the off state, whereby the pump 11 is stopped (Step S7).

Modifications

One preferred embodiment of the present invention has been explained above. However, the present invention is not limited to the above, and a variety of changes can be made without departing from the gist of the present invention.

Modification 1

Figure 4:
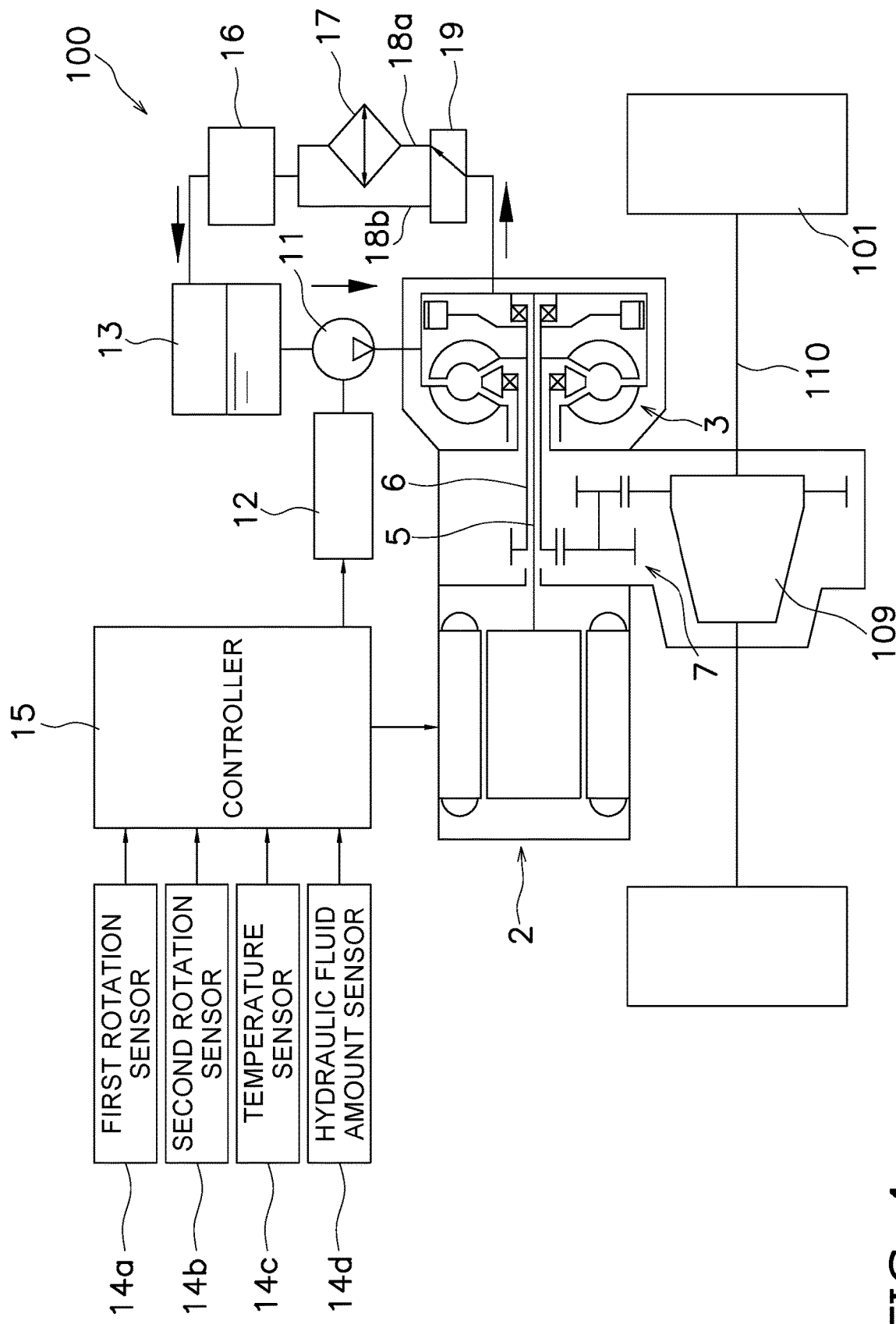
FIG. 4 is a schematic diagram of a drive unit according to a modification.

As shown in FIG. 4, the drive unit 100 can further include a battery temperature adjusting circuit 16, a working fluid cooler 17, a first channel 18a, a second channel 18b, and a switching valve 19. The battery temperature adjusting circuit 16 is configured to adjust a temperature of a battery by the working fluid. When described in detail, the battery temperature adjusting circuit 16 is configured to cool the battery by the working fluid so as to prevent the battery from becoming high in temperature.

The working fluid cooler 17 is configured to cool the working fluid. The first channel 18a is configured to supply the working fluid to the battery temperature adjusting circuit 16 through the working fluid cooler 17. The second channel 18b is configured to supply the working fluid to the battery temperature adjusting circuit 16 without through the working fluid cooler 17. The first channel 18a and the second channel 18b are connected in parallel to each other.

The switching valve 19 is configured to switch between channels as a channel for supplying the working fluid. When described in detail, the switching valve 19 switches between the first channel 18a and the second channel 18b as a channel through which the working fluid flows.

The controller 15 obtains information regarding the external temperature. Then, the controller 15 controls the switching valve 19 based on the obtained information regarding the external temperature. For example, when determining that the external temperature is greater than or equal to a fourth threshold, the controller 15 controls the switching valve 19 such that the working fluid flows through the first channel 18a. Besides, when determining that the external temperature is less than the fourth threshold, the controller 15 controls the switching valve 19 such that the working fluid flows through the second channel 18b.

Modification 2

In the preferred embodiment described above, the controller 15 controls the second electric motor 12 based on all of the following: the input/output rotational ratio (N2/N1), the temperature of the working fluid, and the amount of the working fluid. However, the configuration of controlling by the controller 15 is not limited to this. For example, the controller 15 can control the second electric motor 12 based on any one or two of the following: the input/output rotational ratio (N2/N1), the temperature of the working fluid, and the amount of the working fluid.

Modification 3

In the preferred embodiment described above, the controller 15 indirectly detects the amount of the working fluid in the interior of the torque converter 3 by detecting the amount of the working fluid in the interior of the tank 13. However, the configuration of the controller 15 for detecting the amount of the working fluid in the interior of the torque converter 3 is not limited to this. For example, the controller 15 can directly detect the amount of the working fluid in the interior of the torque converter 3 without detecting the amount of the working fluid in the interior of the tank 13.

Modification 4

In the preferred embodiment described above, the torque converter 3 includes the centrifugal lock-up clutch 37. However, the construction of the torque converter 3 is not limited to this. For example, the torque converter 3 can include a lock-up piston actuated by the pressure of the working fluid. The lock-up piston is axially moved by the pressure of the working fluid applied thereto from the pump 11 and is engaged by friction with the cover 31.

REFERENCE SIGNS LIST

2: First electric motor
3: Torque converter
11: Pump
12: Second electric motor
13: Tank
15: Controller
16: Battery temperature adjusting circuit
17: Working fluid cooler
18a: First channel
18b: Second channel
19: Switching valve
100: Drive unit
101: Drive wheel

What is claimed is:

1. A drive unit, comprising:
a first electric motor configured to drive a drive wheel;
a fluid coupling configured such that a torque outputted from the first electric motor is inputted thereto;
a pump configured to supply a working fluid to an interior of the fluid coupling;
a second electric motor configured to drive the pump; and
a controller configured to control whether the second electric motor is actuated based on the value of an input/output rotational ratio of the fluid coupling relative to a rotational-ratio threshold; the value of a temperature of the working fluid in the interior of the fluid coupling relative to a temperature threshold; and the value of an amount of the working fluid in the interior of the fluid coupling, or an indirect indicator thereof, relative to a working fluid-amount threshold;
the controller being further configured to control whether the second electric motor is actuated based on a determination of whether the first electric motor is rotating in one rotational direction or the opposite rotational direction.

2. The drive unit according to claim 1, further comprising:
a tank configured to store the working fluid to be supplied to the fluid coupling,
wherein the indirect indicator of the amount of the working fluid in the interior of the fluid coupling is an amount of the working fluid in the interior of the tank.

3. The drive unit according to claim 1, further comprising:
a battery temperature adjusting circuit configured to adjust a temperature of a battery by the working fluid;
a working fluid cooler configured to cool the working fluid;
a first channel configured to supply the working fluid to the battery temperature adjusting circuit by passing through the working fluid cooler;
a second channel configured to supply the working fluid to the battery temperature adjusting circuit without passing through the working fluid cooler; and
a switching valve configured to switch between the first channel and the second channel as a channel for suppling the working fluid.

4. The drive unit according to claim 3, wherein the controller is further configured to control switching operation of the switching valve based on the value of ambient temperature relative to an ambient-temperature threshold.

* * * * *